United States Patent
Lorentz et al.

[15] 3,689,591
[45] Sept. 5, 1972

[54] FURAN RESINS MODIFIED WITH CARBOXY CONTAINING COPOLYMER

[72] Inventors: Guido Lorentz, Frankfurt-Hoechst; Dieter Stahl, Kriftel, Tanous, both of Germany

[73] Assignee: Chemische Werke Albert, Wiesbaden-Biebrich, Germany

[22] Filed: April 21, 1971

[21] Appl. No.: 136,232

[30] Foreign Application Priority Data

April 25, 1970 Germany..........P 20 20 260.2

[52] U.S. Cl..............260/829, 260/78.5 R, 260/874, 260/897 R
[51] Int. Cl..............................................C08f 31/04
[58] Field of Search......................................260/829

[56] References Cited

UNITED STATES PATENTS

| | | |
|---|---|---|
| 2,366,049 | 12/1944 | Payne........................260/829 |
| 2,399,055 | 4/1946 | Nordlander...............260/829 |
| 2,749,322 | 6/1956 | Lissant......................260/829 |
| 3,597,386 | 8/1971 | Brabander.................260/829 |
| 3,600,290 | 8/1971 | Fitko.........................260/829 |

*Primary Examiner*—Paul Lieberman
*Attorney*—Hammond & Littell

[57] ABSTRACT

Process for reducing the amount of shrinking that occurs when a furan resin is cured which comprises adding to a furan resin from 15 to 50 percent by weight based on the total weight of the binding material, of a copolymer of (a) at least one $\alpha,\beta$-olefinically unsaturated carboxylic acid component which is at most dibasic and has not more than four carbon atoms and (b) a copolymerizable olefinically unsaturated monomer having from 2 to 18 carbon atoms in a ratio of a) to b) from 1:0.5 to 1:20, said copolymer having an average molecular weight of 400 to 3000, and moulded bodies comprising a cured furan resin containing a copolymer as defined above.

10 Claims, No Drawings

FURAN RESINS MODIFIED WITH CARBOXY CONTAINING COPOLYMER

This invention is concerned with improvements in or relating to furan resins. In particular the invention is concerned with a process for reducing the amount of shrinkage occurring in furan resins.

Furan resins may be prepared by condensing furfuryl alcohol with an acid, if desired in the presence of furfural or by condensing furfural with a carbonyl compound in the presence of a basic catalyst, the latter process being preferably carried out with a mixture of hydrocarbons having at least one, desirably up to three, activated double bonds. The first reaction takes place in acidic medium, for example in the presence of catalytic amounts of dilute sulphuric acid. Such resins may be applied together with furfuryl alcohol or a mixture of furfuryl alcohol and furfural. The second reaction involves an aldol condensation and may be carried out, for example, in the presence of a mixture of caustic soda and sodium acetate or sodium phosphate. Suitable carbonyl compounds are, for example, aldehydes such as acetaldehyde, propionaldehyde, butyraldehyde, isobutyraldehyde, βand acrolein and ketones such as acetone, methylethylketone, methylisobutylketone, diisobutylketone and acetophenone. Examples of hydrocarbons with activated double bonds are cyclopentadiene, dicyclopentadiene, indene, fulvene, 1,4-hexadiene and 5methylnorbornene.

The curing of furan resins prepared as described above can be effected with acid catalysts, for example with p-toluene sulphonic acid, amido sulphonic acid and β-naphtalene sulphonic acid. Furan resins tend however, to shrink substantially during curing so that their utility which would otherwise be considerable because of their excellent alkali resistance, is severely limited. This tendency to shrink is particularly marked whenever the furan resins are used as binders in jointing and tiling compositions, for example, for acid-proof bricks and carbon bricks normally employed in acid-proof constructions.

According to the invention there is provided a process for reducing the amount of shrinking that occurs when a furan resin is cured which comprises adding to a furan resin from 15 to 50 percent by weight based on the total weight of the binding material of a copolymer of (a) at least one $\alpha,\beta$-olefinically unsaturated mono- or dibasic carboxylic acid component having not more than four carbon atoms and (b) a copolymerizable olefinically unsaturated monomer having from 2 to 18 carbon atoms in a ratio of a) : b) from 1:0.5 to 1:20, said copolymer having an average molecular weight of 400 to 3000. Very often the content of component b) is from 50 to 95 mol percent.

Preferably the copolymers also contain a telogen component.

The term "acid component" as used herein means the free acids and their anhydrides and half esters, where such exist. The copolymers obtained may thus contain free carboxyl groups and/or anhydride groups.

The copolymers preferably have an average molecular weight of from 500 to 2,000 and desirably from 600 to 1,500. The copolymers generally contain from 0.08 to 0.9 percent carboxyl groups of corresponding anhydride groups per 100 molecular weight units. The preferred copolymers are those containing a high proportion of carboxyl groups or anhydride groups. The copolymers may be prepared by polymerization or telomerisation of components (a) and (b) above. Suitable olefinically unsaturated, mono- or dibasic carboxylic acid components include acrylic acid, methacrylic acid, maleic acid, maleic anhydride and half-esters of maleic acid with monohydric alcohols e.g., those alcohols having from 1 to 12 carbon atoms. Preferred olefinically unsaturated monomers are the mono-olefinically unsaturated compounds such as mono-olefins, with from 2 to 9 carbon atoms, particularly the α-olefins. Suitable olefinically unsaturated compounds thus include ethylene; propylene; butylene; octene; styrene or styrene derivatives such as the various vinyl toluenes; α-methyl styrene; vinyl monomers; derivatives of acrylic or methacrylic acid e.g., esters, amides or nitriles thereof; vinyl pyridine; vinyl pyrrolidone and allyl compounds such as allyl ester or ethers. The derivatives of acrylic or methacrylic acid are preferably polymerized together with maleic anhydride. If these derivatives are esters, they may be derived from mono- or dihydric alcohols. Illustrative of such derivatives are methyl-, ethyl- and butyl-acrylate and methacrylate, and ethylene glycol, propylene glycol or 1,3-butanediol dimethacrylate or diacrylate. Particularly suitable copolymers are those containing from 60 to 75 mol percent of a vinyl aromatic compound of the formula

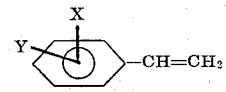

wherein X and Y which may be the same or different may each be hydrogen, chlorine, bromine or methyl provided that not more than one halogen atom and one methyl group is present in the nucleus.

The olefin-carboxylic acid copolymer is preferably a styrene-maleic anhydride telomer and preferably has a molar ratio of carboxylic acid component : olefin of from 1:0.5 to 1:20, preferably from 1:1 to 1:8. the following telomers are suitable starting materials: (a) styrene-maleic anhydride telomers in the molar ratio 1:1, 2:1, 3:1, 5:1 or 8:1, (b) octene-maleic anhydride telomers in the molar ratio of 1:1, (c) styrene-acrylic acid teloemrs in the molar ratio of 1:1 and (d) styrene-vinyl toluene-maleic anhydride telomers in the molar ratio of from 1:1:1 to 3:1:2, e.g. 1:1:1, 1:1:2 or 3:1:2. The preferred telomers are (a) and (b).

The copolymer may also contain cumene or cymene as a telogen or, if desired, other telogens such as p-xylene, or the other xylenes or isomer mixtures of lenes toluene, benzene, chloroform, methyl ethyl ketone or diisobutyl ketone or a combination thereof.

The proportion of telogen component may be up to 35 percent by weight of the copolymer and is preferably from 5 to 25 percent, in particular up to 20 percent by weight of the copolymer. The optimum content of telogen will depend on the molecular weight which it is desired that the copolymer shall have and on the chemical character of the telogen. For example copolymers with an average molecular weight of from about 600 to 700 may have a telogen content of from about 15 to 18 percent by weight and those with an average molecular weight of from about 1,000 to 1,500 may have a telogen content of up to 5 percent by weight. Generally the telogen content should be higher in a copolymer having a lower molecular weight and vice versa.

The copolymers may be prepared by any of the usual methods, for example, copolymerization may be carried out in a solvent, e.g. at a temperature in excess of 150° C. for example from 170° to 220° C. The reaction components are thus added to the solvent, if desired, together with a peroxide initiator. The copolymer formed may be obtained either by precipitation or by distilling off the solvent. The telogens listed above can be used as solvents.

According to one modification of the invention furan resins hardenable by acids can be produced from furfuryl alcohol, if desired in admixture with furfural, even under the conditions to form shaped articles and can immediately be hardened. This offers the advantage that it is not necessary to separately produce the furan resin in advance. Such resins show only, low shrinkage as well as excellent stability. The acid resistance is however, not as good as that of a precondensed furan resin. In every case, however, the incorporation of the copolymer is facilitated by the presence of furfuryl alcohol and possibly furfural because it is soluble in these materials.

It is also possible to process the copolymers with a combination of (1) furan resin and (2) furfuryl alcohol or mixtures of furfuryl alcohol and furfural. The weight ratio of component (1) to component (2) may be from 10:1 to 0.5:1, preferably from 4:1 to 1:1. If furfural is used, the amount employed should not be more than 50, preferably not more than 35 percent, by weight of the furan resin and in general not more than 50 percent, preferably not more than 35 percent, by weight of the furfuryl alcohol.

Several methods of assessing shrink characteristics are available. A method that has proved highly satisfactory in practice is to lay ceramic tiles in a 1 cm bed of cement with 1 cm wide butt joints. For preliminary experiments square tiles with an edge length of 7 cm, a thickness of 15 mm and an overall length of 31 cm may be used. These are referred to below as small size specimens.

For more precise measurements, 8 so-called ceramic gap tiles having a thickness of 25 mm, and an edge length of 110 mm are laid in a 10 mm bed of cement, providing for 10 mm butt joints. These specimens are referred to below as large size specimens. The cement is applied to a foil to which it does not adhere so that the displaceability of the cement bed is not impaired. Shrinkage will result in warping of this beam which is about 1 meter long. The maximum warping of the tile beam in mm is taken as the degree of shrinkage. The tile beam is stored for five days at room temperature, then for 16 hours at 50° C. and subsequently for some days at 60° C. Measurement is always carried out while the beam is warm.

In order that the invention may be well understood the following examples are given by way of illustration only.

Examples 1–4

The composition of the mixtures and the results obtained will be found in table 1 in the appendix. The furan resin solution mentioned in this table is a resin obtained by auto-condensation of 70 parts by weight furfuryl alcohol in the presence of 1.4 parts by weight 5 percent sulphuric acid and that was dissolved in 30 parts by weight furfural. The filler is a mixture of coke flour with a grain size of from 0.01 mm to 0.38 mm. Curing is effected with the acid of amidosulphonic acid.

The products obtained in Examples 1 to 3 were tested to determine whether, after curing, a physical mixture of a) the telomer with b1) furfuryl alcohol and furufral or b2) with furfuryl alcohol, furfural and the furan resin was present or whether a chemical reaction had occurred. For this test, cement cylinders were boiled in acetone and chloroform. After 40 hours of boiling, the cylinders in accordance with example 1 suffered a loss equivalent to the amount of telomer added. In the case of the cylinders in accordance with example 3, there was a loss of less than 1 percent which leads one to the conclusion that the telomer has been built in. If one merely wishes to reduce the degree of shrinkage while utilizing the excellent chemical stability of the furfural-furfuryl alcohol condensate, such compositions can be used since other physical characteristics are not affected. If however, one wishes to have increased resistance to chemical attack the copolymerization products should be combined with a pre-condensed furan resin and preferably also with furfural and furfuryl alcohol.

The dilatometric behavior (the expansion behavior under heat) of the compounds of comparative example A and examples 2 to 4 was assessed. The samples investigated had the approximate dimensions 5 × 5 × 40 mm. The values were measures after 7 days of air storage (m) and a further 16 hours of storage at 90° C. (n).

The samples were heated at a rate of 2.6° C. per minute to a temperature of 120° C. (sample m) and at a heating rate of 1.2° C. per minute to a temperature of 150° C. in the case of sample (n). With sample (n) the lesser heating rate is necessary because, as a result of the ageing that has already taken place, dilatometric changes occur more slowly. To establish the behavior of sample (n) under thermal load, the temperature was kept constant for 5 hours after reaching a value of 150° C. Subsequently, the specimen was cooled to room temperature over a period of 20 minutes by withdrawing it from the oven. The results are shown in table 2.

The mixture described in Example 2, which showed the best chemical resistance at low shrinkage, offers the following further advantages in comparison with formulation A:

a. the adhesion to ceramics is better. After 10 days air storage, a value of 2.1 kg/cm$^2$ was recorded for A and 21.4 kg/cm$^2$ for the product of Example 3.

b. the irreversible thermal elongation (itE) is improved. The values are: after 72 hours at 120° C. for A - 0.34 percent and for Example 3 0.23 percent itE after 72 hours at 230° C. for A - 0.19 percent and for Example 3 0.42 percent itE (negative itE values indicate shrinkage).

An irreversible thermal elongation under the action of heat is of advantage since when the furan resin is used as a cement for the lining of containers it will greatly promote the density of the lining.

Example 5

100 parts by weight furan resin telomer (as described in Example 3) and 500 parts by weight of a filler consisting of 60 parts by weight quartz flour H31, 30 parts by weight quartz flour W10 (both commercial products of Quarzwerke Frechen near Cologne, Germany, 2 parts by weight amidosulphonic acid and 0.5 part by weight p-toluene sulphonic acid, were mixed and a large size specimen as described for Example 3 was prepared from this. As comparison, a mixture of 100 parts by weight solution according to A were made into a cement with 500 parts by weight of the above quartz flour/acid mixture and an identical shrink beam prepared. Both shrink beams were stored as described in both air and heat and the warping measured. The results are shown in table 3. In this case the already low shrinkage is reduced by half as a result of the additive in accordance with the invention.

Example 6

The addition of the telomer also influences the shrinkage of those furan resin/filler mixtures in which the furan resin is used as a condensation product from furfural and a low aliphatic aldehyde or ketone.

In accordance with Example 1 of German Pat. No. 1,048,413 a liquid condensate with a viscosity of approximately 200 cP at 20° C. is prepared from 1 mol furfural, 1 mol acetaldehyde and 0.25 mol dicyclopentadiene. A solution is then prepared from 75 parts by weight of this condensate and 25 parts by weight of the telomer used in Example 1. This solution has a viscosity of approximately 800 cP at 25° C. 100 parts by weight of this solution are mixed with 185 parts by weight of a mixture from 95 parts by weight coke flour of granulation 0.01 to 0.48 mm, 4.25 parts by weight p-toluene sulphonic acid and 0.75 part by weight dimethylaniline, a shrink beam (large size specimen) then being prepared. For comparison, a shrink beam is also prepared which contains in the cement a resin solution in accordance with example 1 of German Pat. No. 1,048,413 as binder. The resin solution and the filler described above are mixed in the ratio stated below. The results are shown in table 4.

Table 1

|  | Comparison | | | | Example | | | |
|---|---|---|---|---|---|---|---|---|
|  | A | B | C | D | 1 | 2 | 3 | 4 |
| Furfural |  | 5 | 10 | 7.9 | 30 | 13.2 | 12.5 | 12.5 |
| Furfuryl alcohol |  |  |  | 7.9 | 20 | 13.2 | 12.5 | 12.5 |
| Telomer of styrene and maleic anhydride |  |  |  |  |  |  |  |  |
| 10:1 |  |  |  |  |  |  |  | 25 |
| 8:1 |  | 5 | 10 |  | 30 |  | 25 |  |
| 4.8:1 |  |  |  | 14.2 |  | 23.6 |  |  |
| 2:1 |  |  |  |  | 20 |  |  |  |
| furan resin solution | 100 | 90 | 80 | 70 | 50 | 50 | 50 | 50 |
| Filler | 166 | 166 | 166 | 166 | 166 | 166 | 166 | 166 |

All mixtures had the same viscosity and also always the same consistency.

Shrinkage, in each case in mm warping:

Small size specimens

| After 5 days air storage | 1.0 | 1.4 | 1.3 | 0.5 | 0.1 | 0.2 | 0 | 0 |
|---|---|---|---|---|---|---|---|---|
| after 1 day at 60°C | 1.0 | 1.6 | 1.3 | 0.6 | 0 | 0.2 | 0 | 0 |
| after 2 days at 60°C | 1.2 | 1.8 | 1.7 | 1.0 | 0 | 0.2 | 0 | 0.1 |
| after 3 days at 60°C | 1.6 | 1.9 | 1.7 | 1.0 | 0 | 0.2 | 0.1 | 0.1 |
| after 6 days at 60°C | 1.9 | 2.7 | 1.9 | 1.2 | 0 | 0.3 | 0.1 | 0.2 |
| after 7 days at 60°C | 2.1 | 2.8 | 2.3 | 1.6 | 0.1 | 0.4 | 0.2 | 0.2 |

Large size specimens

| after 5 days air storage | 0.1 |  |  |  |  |  | 0 |  |
|---|---|---|---|---|---|---|---|---|
| after a further 16 hours at 50°C | 4.6 |  |  |  |  |  | 0.3 |  |
| after a further 24 hours at 60°C | 13.3 |  |  |  |  |  | 0.7 |  |

|  | Comparison | | | | Example | | | |
|---|---|---|---|---|---|---|---|---|
|  | A | B | C | D | 1 | 2 | 3 | 4 |
| after a further 24 hours at 60°C | 14.7 |  |  |  |  |  | 1.3 |  |

Table 2

Expansion behavior under heat

|  | Comparison | Example | | |
|---|---|---|---|---|
|  | A | 2 | 3 | 4 |
| (m) 7 days air storage | 0.49% |  | 0.16% | 0.07% 0.19% |
| (n) after further 16 hours at 90°C | 0.12% |  | 0.04% | 0.04% 0.01% |
| total | 0.61% |  | 0.20% | 0.11% 0.20% |

Table 3

(referring to Example 5)

| Time | Temp. °C | Shrinkage: with solution according to example 3 | Warping in mm Comparison A |
|---|---|---|---|
| 5 days | 20-22 | 0.01 | 0.2 |
| + further 16 hours | 50 | 0.25 | 0.45 |
| + further 24 hours | 60 | 0.65 | 1.35 |
| + further 24 hours | 60 | 1.05 | 2.10 |
| + further 24 hours | 60 | 1.65 | 2.95 |

Table 4

(referring to Example 6)

Comparison of shrinkage

|  |  | Warping in mm | |
|---|---|---|---|
|  | Temp. °C | with addition | without addition |
| 5 days | 20-23 | 0.2 | 0.1 |
| + further 16 hours | 50 | 0.2 | 2.6 |
| + further 24 hours | 60 | 0.7 | 9.4 |
| + further 24 hours | 60 | 1.0 | 14.3 |
| + further 24 hours | 60 | 1.0 | failed as stress too high |

What we claim is:

1. A process for reducing the amount of shrinking that occurs when a furan resin is cured which comprises adding to a furan resin from 15 to 50 percent by weight based on the total weight of the binding material, of a copolymer of (a) at least one $\alpha,\beta$-olefinically unsaturated carboxylic acid component which is at most dibasic and has not more than four carbon atoms and (b) a copolymerizable olefinically unsaturated monomer having from 2 to 18 carbon atoms in a ratio of a) to b) from 1:0.5 to 1:20, said copolymer having an average molecular weight of 400 to 3,000.

2. A process as claimed in claim 1 in which the copolymer is processed with a combination of (1) furan resin and (2) furfuryl alcohol or a mixture of furfuryl alcohol and furfural respectively wherein the ratio of the weight of component (1) to component (2) is from 10:1 to 0.5:1.

3. A process as claimed in claim 1 in which under conditions to form shaped articles acid hardenable furan resins are prepared from a) furfuryl alcohol or b) furfuryl alcohol and furfural and hardened.

4. A process as claimed in claim 1 in which the copolymer contains a telogen component derived from cumene, cymene, xylene or a combination thereof.

5. A process as claimed in claim 1 in which the copolymers have an average molecular weight of 500 to 2,000.

6. A process as claimed in claim 1 in which the total of carboxylic groups in the copolymer including those which are present in the form of anhydrides is between 0.08 and 0.9 percent per 100 molecular weight units.

7. A process as claimed in claim 1 in which the olefinically unsaturated monomer is a mono-olefin with from two to nine carbon atoms.

8. A process as claimed in claim 1 in which the copolymer contains from 5 to 25 percent by weight of telogen.

9. A process as claimed in claim 1 in which the furan resin is processed with furfural and the amount of furfural used is not more than 50 percent by weight based on the furan resin and not more than 50 percent by weight based on the furfuryl alcohol.

10. Moulded bodies comprising a cured furan resin containing a copolymer in accordance with the process as claimed in claim 1.

* * * * *